(12) United States Patent
Kardashov et al.

(10) Patent No.: US 10,692,532 B2
(45) Date of Patent: Jun. 23, 2020

(54) SYSTEMS AND METHODS FOR VIDEO SYNOPSES

(71) Applicant: Zhejiang Dahua Technology Co., Ltd., Zhejiang (CN)

(72) Inventors: Vlad Kardashov, Ontario (CA); John Distelzelweig, Santa Barbara, CA (US)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 444 days.

(21) Appl. No.: 15/413,709

(22) Filed: Jan. 24, 2017

(65) Prior Publication Data

US 2017/0133053 A1  May 11, 2017

Related U.S. Application Data

(63) Continuation of application No. PCT/US2015/042208, filed on Jul. 27, 2015.

(60) Provisional application No. 62/029,966, filed on Jul. 28, 2014.

(51) Int. Cl.
*G11B 27/02* (2006.01)
*H04N 7/18* (2006.01)
*G11B 27/34* (2006.01)
*G08B 13/196* (2006.01)
(Continued)

(52) U.S. Cl.
CPC ........ *G11B 27/02* (2013.01); *G08B 13/19656* (2013.01); *G11B 27/28* (2013.01); *G11B 27/34* (2013.01); *H04N 5/77* (2013.01); *H04N 7/181* (2013.01)

(58) Field of Classification Search
CPC ......... G11B 27/02; G11B 27/34; G11B 27/28; G08B 13/19656; H04N 7/181; H04N 5/77
See application file for complete search history.

(56) References Cited

U.S. PATENT DOCUMENTS

2004/0080615 A1* 4/2004 Klein ............... G08B 13/19658
348/143
2006/0117356 A1  6/2006 Jojic et al.
(Continued)

FOREIGN PATENT DOCUMENTS

WO  WO 2008093321  8/2008
WO  WO 2014044643  3/2014

*Primary Examiner* — Thai Q Tran
*Assistant Examiner* — Sunghyoun Park
(74) *Attorney, Agent, or Firm* — McDermott Will & Emery LLP

(57) ABSTRACT

Systems and methods are disclosed for efficient generation and presentation of synopsis videos that include video images of multiple objects captured at various times displayed at a common time. The system may include one or more network cameras that, when a moving object is detected, record a video file for that object and provide the video file to a cloud server. The cloud server may queue video files from the one or more network cameras and, when a user requests a synopsis video of a period of time, the video files captured during that period of time may be used by the cloud server to generate the synopsis video. The cloud server may also generate a plurality of object indicators that are provided with each of several chapters of the synopsis video in a scrollable arrangement that allows the user the scroll through objects and chapters.

5 Claims, 9 Drawing Sheets

(51) Int. Cl.
*G11B 27/28* (2006.01)
*H04N 5/77* (2006.01)

(56) References Cited

U.S. PATENT DOCUMENTS

| | | | |
|---|---|---|---|
| 2007/0168413 A1* | 7/2007 | Barletta | G06F 3/04883 |
| | | | 709/203 |
| 2009/0046147 A1 | 2/2009 | Henson | |
| 2009/0058611 A1* | 3/2009 | Kawamura | H04N 7/185 |
| | | | 340/10.1 |
| 2013/0064476 A1* | 3/2013 | Cohen | G06F 16/5866 |
| | | | 382/305 |
| 2015/0154840 A1* | 6/2015 | Black | G08B 13/19684 |
| | | | 348/143 |
| 2015/0212719 A1 | 7/2015 | Gottschlag et al. | |
| 2017/0040036 A1* | 2/2017 | Ryu | G11B 27/031 |

* cited by examiner

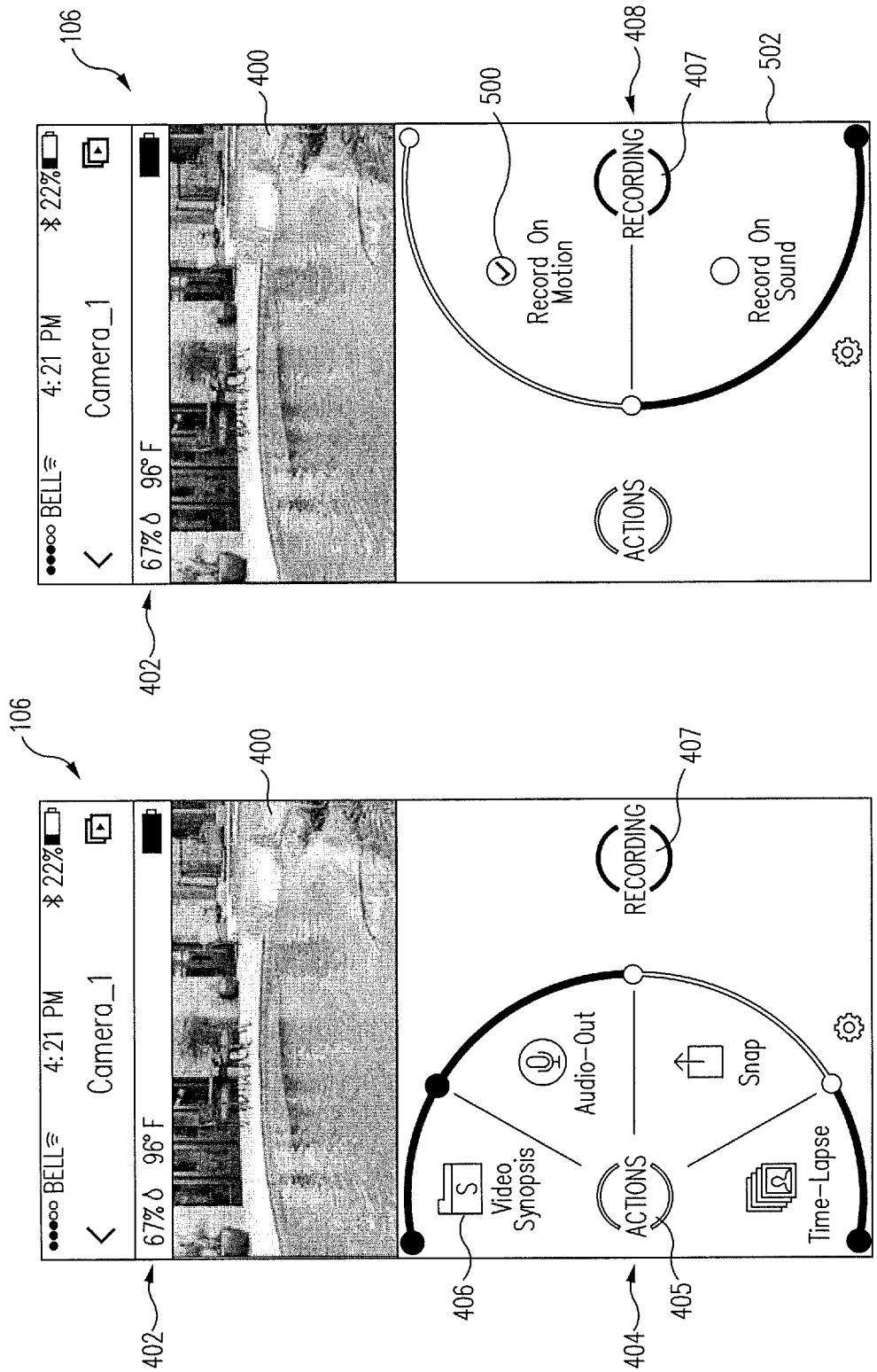

SYSTEMS AND METHODS FOR VIDEO SYNOPSES

CROSS-REFERENCE TO RELATED APPLICATIONS

This application is a continuation of International Patent Application No. PCT/US2015/042208 filed Jul. 27, 2015 and entitled "SYSTEMS AND METHODS FOR VIDEO SYNOPSES", which is incorporated herein by reference in its entirety.

International Patent Application No. PCT/US2015/042208 filed Jul. 27, 2015 claims priority to and the benefit of U.S. Provisional Patent Application No. 62/029,966 filed Jul. 28, 2014 and entitled "SYSTEMS AND METHODS FOR VIDEO SYNOPSES" which is hereby incorporated by reference in its entirety.

TECHNICAL FIELD

One or more embodiments of the invention relate generally to camera systems and more particularly, for example, to systems and methods for generating and presenting synopsis videos.

BACKGROUND

Network cameras have been developed that can continuously monitor a scene and store long sequences of recorded video for later review either locally at the camera or using a recording device such as a digital video recorder (DVR) or network video recorder (NVR) or remotely using cloud-based storage. Some systems having network cameras can detect moving objects in the recorded video stream and can generate a synopsis video of the detected moving objects by providing portions of the recorded video stream in a new synopsis video.

However, these conventional systems have some limitations that can prevent widespread implementation and consumer interest. For example, because the original recorded video stream is so large, local processing servers are often necessary to generate synopsis videos. These systems can be expensive and difficult to install and can therefore limit the interest of a typical consumer. Moreover, even with the necessary equipment, in conventional systems, it can be difficult for a user to sort through and select objects of interest from a crowded synopsis video that includes overlapping objects selected from a long and continuous input video stream.

There is therefore a need in the art for improved systems and methods for generating synopsis videos.

SUMMARY

Techniques are disclosed for systems and methods to efficiently generate and provide easily searchable and navigable synopsis videos in accordance with one or more embodiments. According to various embodiments, the synopsis videos may be provided with multiple chapters that each include video images of objects detected during a time period associated with that chapter. Each chapter may be provided with a plurality of scrollable object indicators, each associated with one of the objects.

The synopsis videos may be generated based on one or more video files such as video motion detection files provided from one or more network cameras to a cloud server. The cloud server may queue the video motion detection files and, in response to a request from a user, generate the synopsis video and the object indicators using the queued video motion detection files.

According to an embodiment, a system is provided that includes a camera configured to record a video file and one or more processors configured to receive the video file from the camera, provide images of an object from the video file into a chapter of a synopsis video, and provide an object indicator for the object and associated with the chapter of the synopsis video.

According to another embodiment, a method is provided that includes, recording a video file with a camera, providing images of an object from the video file into a chapter of a synopsis video, and providing an object indicator for the object and associated with the chapter of the synopsis video.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4 is an illustrative diagram of a user device display showing various selectable options for managing and viewing video from a network camera in accordance with an embodiment of the disclosure.

FIG. 5 is an illustrative diagram of a user device display showing various selectable options for recording video based on a trigger with a network camera in accordance with an embodiment of the disclosure.

FIG. 6 is an illustrative diagram of a user device display showing various tunable options for video recording triggers for a network camera in accordance with an embodiment of the disclosure.

FIG. 7 is an illustrative diagram of a user device display showing local storage monitoring information for a network camera that can be viewed with the user device in accordance with an embodiment of the disclosure.

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, systems having cameras such as network cameras are provided. A system may, for example, be a monitoring system having one or more network-connected cameras that are accessible over a network from one or more user devices. Systems and methods may be provided for the generation and presentation of synopsis videos that include video images of detected objects in video data that has been recorded using one or more network cameras.

Figure 1:
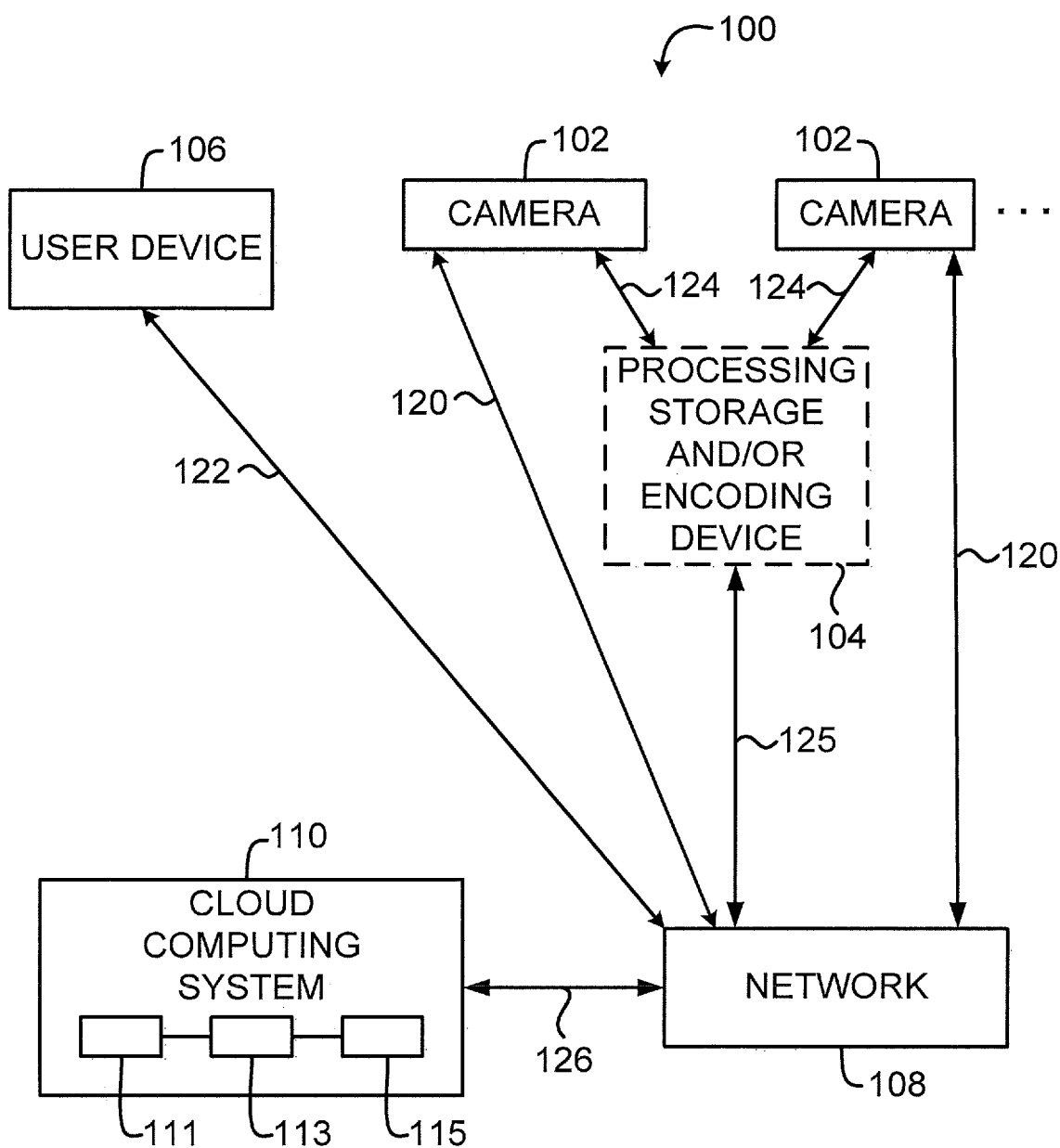
FIG. 1 is an illustrative diagram of a system for generating synopsis videos in accordance with an embodiment of the disclosure.

FIG. 1 illustrates a block diagram of a system 100 having cameras in accordance with an embodiment of the disclosure. In the embodiment shown in FIG. 1, system 100 includes a plurality of cameras 102 connected to a network 108. Network 108 may be a local network such as a wireless local area network (WLAN) or a relatively wider area network such as the internet. As shown in FIG. 1, cameras 102 may communicate with one or more other devices such as a user device 106, a processing storage and/or encoding device 104 (e.g., a multi-channel video device such as an network video recorder or a digital video recorder), and/or remote computing equipment such as cloud computing system 110.

For example, cameras 102 can send and receive data to and from user device 106 via network 108 over wired and/or wireless communications paths 120 and 122. As another example, cameras 102 can send and receive data to and from cloud computing system 110 via network 108 over wired and/or wireless communications paths 122 and 126. As another example, video data may be provided from one or more of cameras 102 to device 104. Device 104 may store and/or provide received video data to user device 106 and/or cloud computing system 110.

Cloud computing system 110 may include one or more servers and/or one or more databases. According to various embodiments, cloud computing system 110 may be a dedicated server for performing video synopsis generation operations or cloud computing system 110 may be provided with other functionality such as video storage capabilities. In one embodiment, cloud computing system 110 may include a data routing server 111 that controls the flow of data to and from one or more databases 113 that are communicatively coupled to the routing server 111. In some embodiments, cloud computing system 110 may also include one or more processing servers such as application server 115 that perform data processing and/or other software execution operations for system 100 (e.g., video analytics, data compression or encoding, data encryption, synopsis video generation, and/or other applications). Application server 115 may include one or more processors (e.g., logic devices, microcontrollers, processors, application specific integrated circuits (ASICs), field programmable gate arrays (FPGAs) or other devices) that may be used cloud computing system 110 to execute appropriate instructions, such as software instructions stored in memory of application server 115 and/or databases 113.

Cloud computing system 110 may receive data from cameras 102 and/or user device 106 and may provide data to cameras 102 and/or user device 106 over network 108. For example, one or more cameras 102 may record and provide a video motion data (VMD) file to cloud computing system 110 when an object is detected in video images captured by the camera. A VMD file may include video data of a detected object such as a moving object that extends from the time the object is detected in the field of view of the camera to the time the object leaves the field of view of the camera. For example, a VMD file may include ten seconds (or one second or 100 seconds, as examples) of video of a vehicle or a person passing by a security camera. Storing VMD files rather than a full length video stream may help limit the amount of data transferred to cloud computing system 110 by reducing or eliminating the transmission of video data that does not include an objects (e.g., moving objects) of interest.

Cameras 102 may also provide one or more background images periodically to cloud computing system 110. Cloud computing system 110 may store the background images and VMD files for use in generating synopsis videos when a user requests a synopsis video (e.g., with user device 106).

In another example, the VMD files may be recorded and provided to could computing system 110 by device 104. Video data associated with detected objects may be stored by any or all of cameras 102, device 104, cloud computing system 110 and/or user device 106.

By providing VMD files and periodic background images to cloud computing system 110 for synopsis video generation, a system may be provided that includes the computing equipment necessary for processing to generate synopsis videos without requiring a user to purchase and maintain that computing equipment. In this way, a powerful and relatively inexpensive camera system such as a monitoring system may be provided with synopsis capabilities for a user. When a user desires to obtain a synopsis video, user device 106 may be used to request the synopsis video from cloud computing system 110 and to view and/or navigate the synopsis video and any associated object videos.

In one embodiment, system 100 may be a monitoring system (e.g., a security system) for a business or a home in which cameras 102 provide VMD files and background images to cloud computing system 110 for storage. Full resolution VMD files and/or continuous video streams may also be stored by cameras 102 and/or device 104. Whenever the user of the security system wishes to view a synopsis video or an object video associated with the synopsis video, the user can access (e.g., download, navigate, and/or stream) the synopsis video data from cloud computing system 110 (e.g., via network 108 over communications paths 122 and 126).

As shown in FIG. 1, cameras 102 may be connected directly to network 108. However, system 100 may also, or alternatively, include one or more additional devices such as processing, storage and/or encoding device 104. In various embodiments, cameras 102 may be connected to network 108 through processing, storage and/or encoding device 104 (e.g., over wired and/or wireless communications paths 124 and/125), may be connected directly to both processing, storage and/or encoding device 104 and network 108 (e.g., over wired and/or wireless communications paths 124 and 120 respectively), may be connected to network 108 over communications paths 120 and free of connections to processing, storage and/or encoding device 104, and/or may be connected to processing, storage and/or encoding device 104 over communications paths 124 and be free of connections to network 108.

Processing, storage and/or encoding device 104 may include one or more processors and one or more memory devices (e.g., volatile and/or non-volatile memory devices such as RAM (Random Access Memory), ROM (Read-Only Memory), EEPROM (Electrically-Erasable Read-Only Memory), flash memory, a disk drive, and/or other types of memory). Processing, storage and/or encoding device 104 may be implemented as a digital video recorder (DVR), a network video recorder (NVR), and/or a device having both DVR and NVR capabilities.

In embodiments in which device 104 is implemented as a DVR, video data such as streaming video data and/or VMD files from one or more cameras 102 may be received directly from cameras 102, encoded, compressed, processed, and/or stored by device 104. In embodiments in which device 104 is implemented as an NVR, video data from cameras 102 may be encoded, compressed, and/or processed by the camera and received over a network and/or stored by device 104. However, these examples are merely illustrative. One or more channels of data may be received at device 104 and may be stored by device 104 and/or provided in one or more channels to a remote system such as system 110 and/or user device 106. In various embodiments, cameras 102, processing, storage and/or encoding device 104, user device 106, and/or cloud computing system 110 can exchange video data and/or other information and can cooperate to capture, process, encode, encrypt, store, view, or otherwise handle some or all of the video data as desired.

User device 106 may be a computing device such as a desktop computer or a mobile computing device such as a mobile phone, tablet, personal digital assistant (PDA), laptop computer or other computing device having communications circuitry (e.g., wireless communications circuitry or wired communications circuitry) for connecting with other devices.

Figure 2:
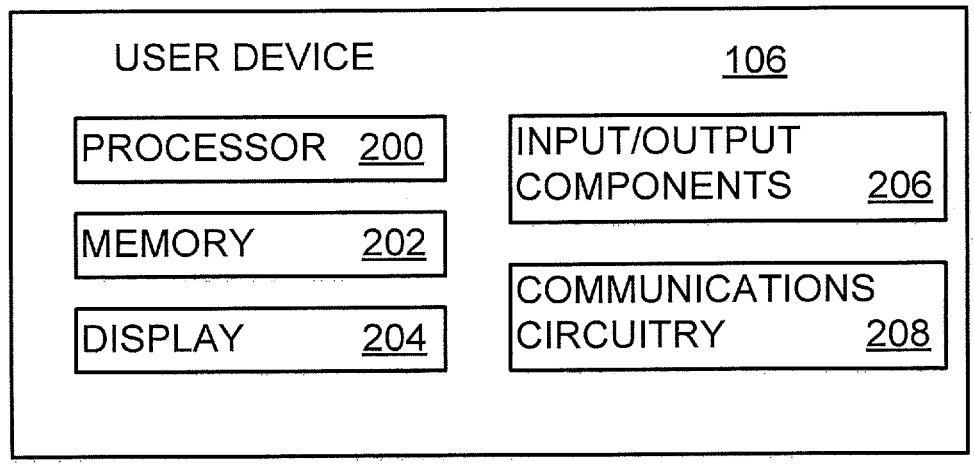
FIG. 2 is a block diagram of an illustrative user device for requesting, viewing, and navigating synopsis videos in accordance with an embodiment of the disclosure.

As shown in FIG. 2, according to an embodiment, user device 106 may include components such as processor 200, memory 202, display 204, input/output components 206, and communications circuitry 208. Processor 200 may be implemented as any appropriate processing device (e.g., logic device, microcontroller, processor, application specific integrated circuit (ASIC), a field programmable gate array (FPGA), or other device) that may be used by user device 106 to execute appropriate instructions, such as software instructions stored in memory 202.

Memory 202 may include one or more memory devices (e.g., memory components) that store data and information, including image data (e.g., including video data), audio data, network information, camera information, account information, and/or other types of sensor data, and/or monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, memory 202 may include a portable memory device that can be removed from user device 106 and used to convey stored data to other systems. In some embodiments, processor 200 may be configured to execute software instructions stored on memory 202 to perform various methods, processes, or operations in the manner described herein.

Display 204 may include any suitable user-viewable display for displaying camera information, images such as video images from one or more network cameras and/or remote computing equipment, a camera control interface for controlling a network camera, or other images or information for displaying to a user. For example, display 204 may be a liquid crystal display, a touch-screen display or other type of display. Input/output components 206 may include one or more buttons, indicators (e.g., LEDs), keyboards, trackballs, knobs, joysticks, and/or other type of user interface adapted to accept user input and/or provide user feedback.

Communications circuitry 208 may include circuitry for communicating with other devices using various communications protocols. As examples, communications circuitry that may be included in a user device may include near field communications (NFC) circuitry (e.g., a powered or unpowered NFC integrated circuit that generates, receives, and/or processes communication signals according to radio-frequency identification (RFID) standards such as the ISO/IEC 14443, ISO/IEC 18092 or FeliCa standards), wireless network (WiFi®) circuitry, a modular cellular component that generates, receives, and/or processes communications signals over one or more cellular data networks, wireless communication components that generate, receive, and/or process communications signals based on, for example, the Bluetooth® standard, other appropriate short range wireless communication standards circuitry, a wireless broadband component (e.g., based on WiMax technologies), a wireless satellite component, or other appropriate wireless communication components.

Communications circuitry 208 may also be configured for a proprietary wireless communication protocol and interface based on radio frequency (RF), microwave frequency (MWF), infrared frequency (IRF), and/or other appropriate wireless transmission technologies. Communications circuitry 208 may include one or more antennas for wireless communication purposes. Thus, in one example, communications circuitry 208 may handle, manage, or otherwise facilitate wireless communication by establishing wireless communication links to a wireless router, hub, or other appropriate wireless devices.

Communications circuitry 208 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 208. Communications circuitry 208 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Figure 3:
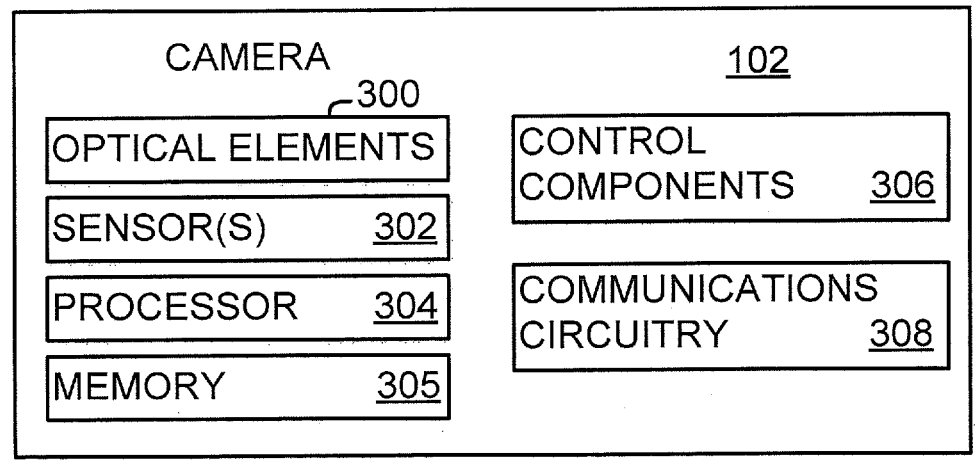
FIG. 3 is a block diagram of an illustrative network camera in accordance with an embodiment of the disclosure.

As shown in FIG. 3, according to an embodiment, camera 102 may include components such as imaging components (e.g., optical elements 300 and one or more sensors 302), processor 304, memory 305, control components 306, and communications circuitry 308.

Sensor(s) 302 may include imaging sensors sensitive to light in one or more wavelength bands and/or other sensors (e.g., environmental sensors such as humidity, temperature, location, or other sensors). Imaging sensors may include a visible light sensor, a thermal infrared sensor, a long wavelength infrared (LWIR) sensor, a mid wavelength infrared (MWIR) sensor, a short wavelength infrared (SWIR) sensor, a near infrared (NIR) sensor, and/or one or more hybrid image sensors for capturing images in response to light in multiple different wavelength bands. Sensor(s) 302 may include other types of sensors such as a microphone for detecting sounds, a thermometer, a humidity sensor, or other sensors.

Imaging sensors may be arranged to receive light through one or more of optical elements 300. Optical elements 300 may include one or more lenses, filters, films, gratings, prisms, beam splitters, or other suitable optical elements for filtering, focusing, zooming, and/or otherwise blocking, passing, processing, and/or directing light onto one or more of sensors 302.

Processor 304 may be implemented as any appropriate processing device (e.g., logic device, microcontroller, processor, application specific integrated circuit (ASIC), a field programmable gate array (FPGA), or other device) that may be used by camera 114 to execute appropriate instructions, such as software instructions stored in memory 305. Processor 304 may operate one or more of sensors 302 to capture images such as video images and to store some or all of the video images in response to an automated trigger such as a sound, a detected moving object in the video images, and/or an object of a particular temperature in the video images. For example, the processor may be arranged to compare one or more consecutive video image frames and detect (e.g., based on edge detection or other motion detection operations) a moving object based on the comparison and to initiate capture and storage of a VMD file including video of the moving object while the moving object is in the field of view of the camera.

In another example, the processor may be arranged to analyze thermal images (e.g., thermal images from a temperature calibrated thermal imaging module) to detect an object having a temperature within a predetermined range (e.g., having a temperature of a human) and to initiate capture and storage of a VMD file including video of the object while the object is in the field of view of the camera.

Memory 305 may include one or more memory devices (e.g., memory components) that store data and information, including image data (e.g., including video data), audio data, network information, camera information, and/or other types of sensor data, and/or other monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, memory 305 may include a portable memory device that can be removed from camera 102 and used to convey stored data to other systems. In some embodiments, processor 304 may be configured to execute software instructions stored on memory 305 to perform various methods, processes, or operations in the manner described herein. Control components 306 may include one or more buttons, indicators (e.g., LEDs), keyboards, displays, trackballs, knobs, joysticks, and/or other type of user interface adapted to accept user input and/or provide user feedback.

Communications circuitry 308 may include circuitry for communicating with other devices using various communications protocols. As examples, communications circuitry that may be included in a camera such as a network camera may include near field communications (NFC) circuitry (e.g., a powered or unpowered NFC integrated circuit that generates, receives, and/or processes communication signals according to radio-frequency identification (RFID) standards such as the ISO/IEC 14443, ISO/IEC 18092 or FeliCa standards), wireless network (WiFi®) circuitry, a modular cellular component that generates, receives, and/or processes communications signals over one or more cellular data networks, wireless communication components that generate, receive, and/or process communications signals based on, for example, the Bluetooth® standard, other appropriate short range wireless communication standards circuitry, a wireless broadband component (e.g., based on WiMax technologies), a wireless satellite component, or other appropriate wireless communication components.

Communications circuitry 308 may also be configured for a proprietary wireless communication protocol and interface based on radio frequency (RF), microwave frequency (MWF), infrared frequency (IRF), and/or other appropriate wireless transmission technologies. Communications circuitry 308 may include one or more antennas for wireless communication purposes. Thus, in one example, communications circuitry 308 may handle, manage, or otherwise facilitate wireless communication by establishing wireless communication links to a wireless router, hub, or other appropriate wireless devices.

Communications circuitry 308 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 308. Communications circuitry 308 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Communications circuitry 308 may be used to provide VMD files and/or background images to device 104 and/or cloud computing system 110. Communications circuitry 308 may also be used to provide stored and/or streaming video to user device 106.

FIG. 4 is a diagram of an exemplary implementation of user device 106 in accordance with an embodiment. In the example of FIG. 4, a streaming video display 400 is displayed by user device 106. Additional information 402 such as a temperature (e.g., 96° F.) or a humidity (e.g., 67%) of the scene in the streaming video may be displayed along with the streaming video display 400. The streaming video display 400, additional information 402 and control options such as actions options 404 and a selectable recording options icon 407 may be displayed by a video management application running on user device 106.

As shown in FIG. 4, actions options 404 may be displayed when "ACTIONS" icon 405 is selected (e.g., clicked using a mouse and a cursor or using a touchscreen) and may include a video synopsis option 406 that, when selected, provides a user with options for requesting, viewing, and/or navigating a synopsis video.

In a synopsis video, images of moving objects detected previously stored video can be extracted to be included in the synopsis video. The synopsis video is then generated including all of the detected objects presented, sometimes partially overlapping, at the same time. In some systems, a time stamp is provided in the synopsis video next to a particular object and, when the time stamp is clicked, video of the single object can be played.

As shown in FIG. 5, when a "RECORDING" icon 407 is selected, recording options 408 may be displayed. Recording options 408 may include an option 500 to record video when motion is detected (e.g., a selectable "Record On Motion" option) and an option 502 to record video when a sound is detected (e.g., a "Record On Sound" option). Other record options may also be provided such as an option to record when an object in a given temperature range is detected.

Recording options such as options 500 and 502 may be tunable options. For example, the video management application may provide the user with the ability to adjust the sound, motion, and/or temperature levels at which video recording is triggered.

Figures 6, 7:
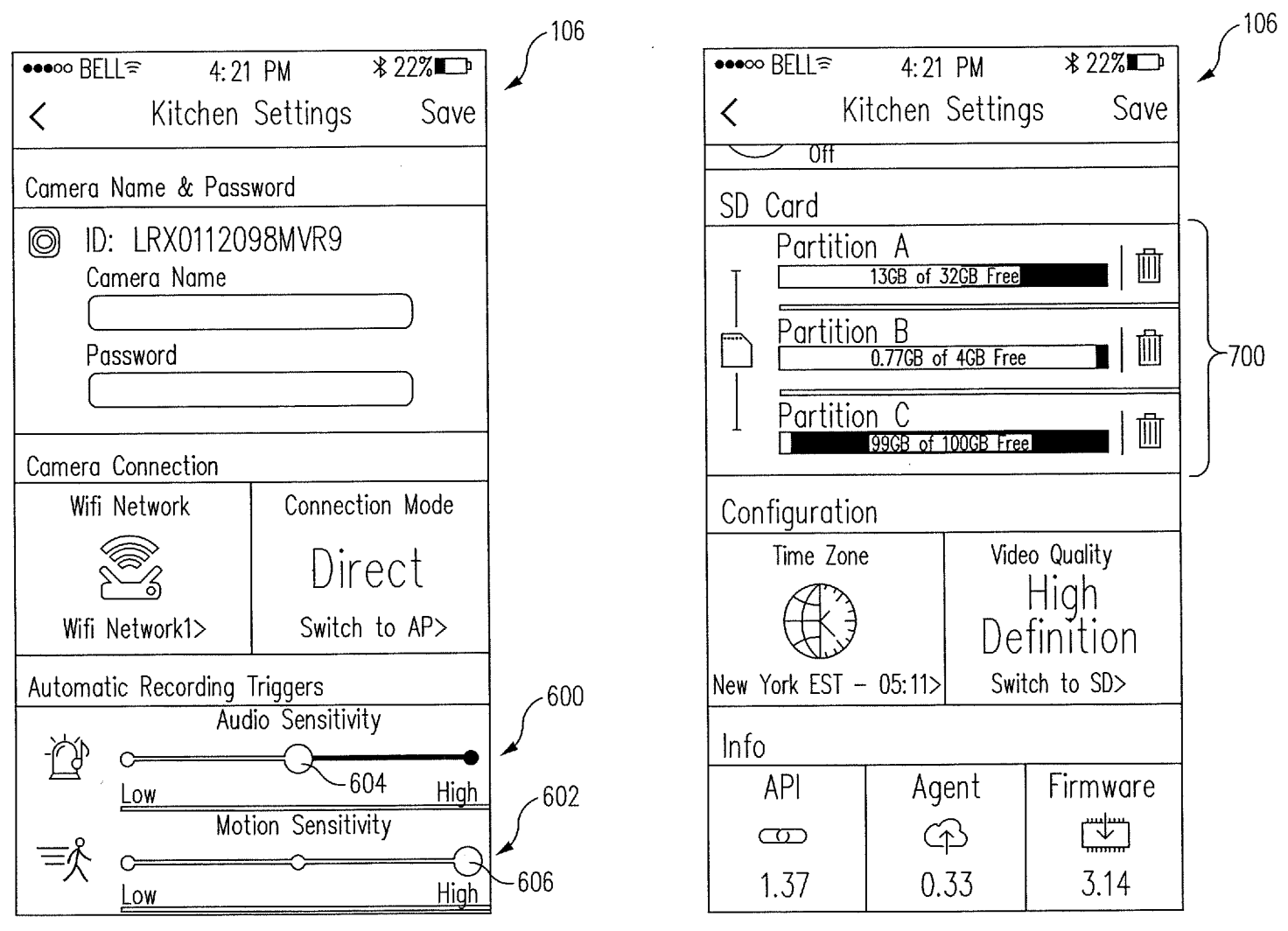

FIG. 6 shows an exemplary implementation of a tunable audio sensitivity control 600 for controlling the level of sound that triggers video recording and a tunable motion sensitivity control 602 for controlling the amount of motion and/or the confidence in the detected motion that triggers video recording. In the example of FIG. 6, audio sensitivity control 600 is implemented using a virtual slide switch 604 and motion sensitivity control 602 is implemented using a virtual slide switch 606. However, this is merely illustrative and it will be appreciated by one skilled in the art that any suitable adjustment mechanism may be provided to adjust the sensitivity of a video recording trigger. A video file such as a VMD file may be stored and provided to cloud computing system 110 and/or device 104 each time video recording is initiated due to an audio, motion, and/or temperature trigger.

As shown in FIG. 7, a user may be provided with memory information 700 for monitoring the status of local storage associated with one or more network cameras such as storage within the camera and/or DVR and/or NVR storage.

Figures 8, 9:
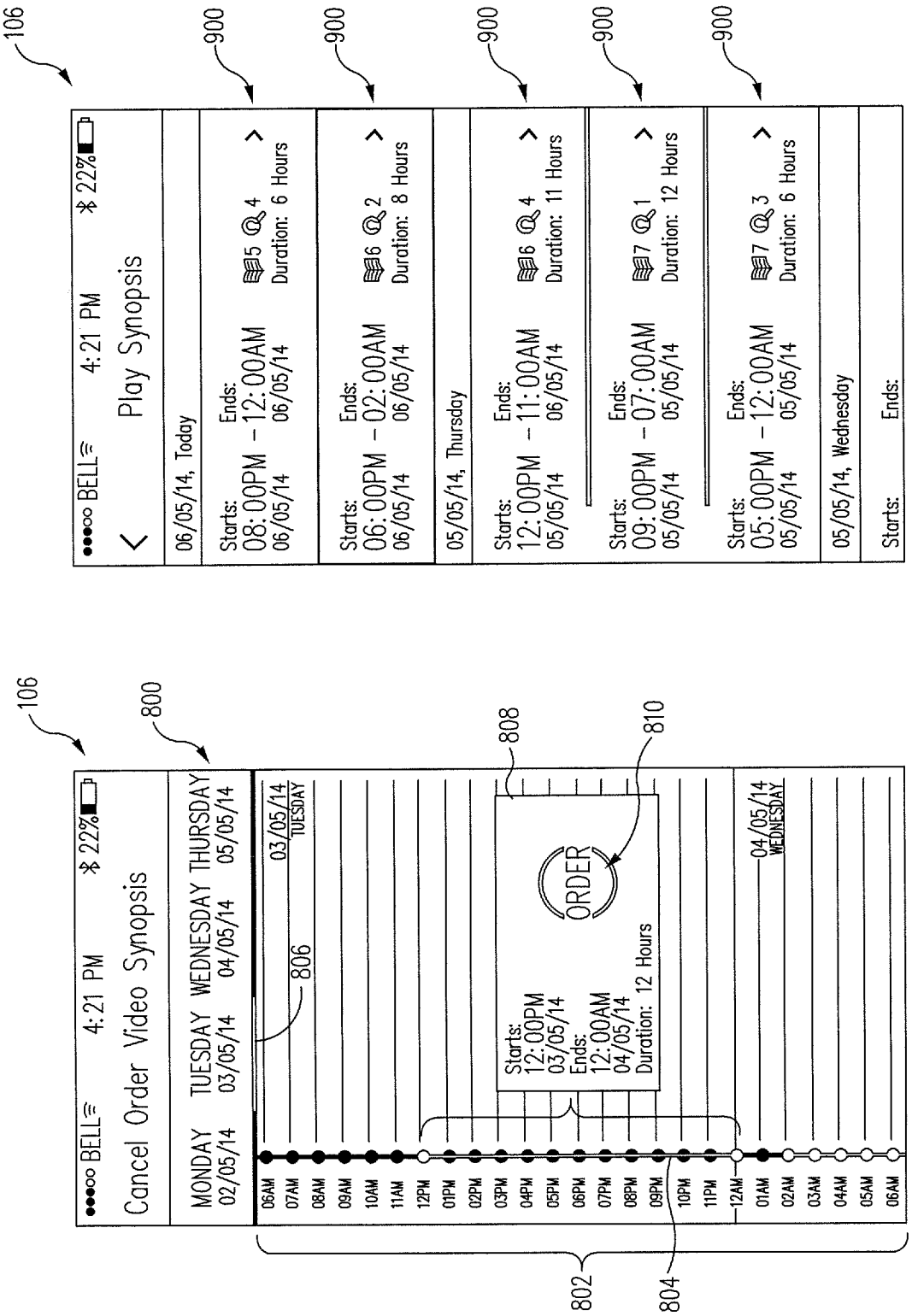
FIG. 8 is an illustrative diagram of a user device display showing how a user may be provided with the ability to select various parameters of, and to order a synopsis video in accordance with an embodiment of the disclosure.
FIG. 9 is an illustrative diagram of a user device display showing how a user may be provided with the ability to select from one or more synopsis videos in accordance with an embodiment of the disclosure.

When a video synopsis for a period of time during which one or more network cameras have been capturing images is desired, a user may click on video synopsis icon 406 (see FIG. 4) and, responsive to receiving the user selection of the video synopsis icon, user device 106 may provide the user with one or more selectable synopsis parameters or options as shown in FIG. 8.

As shown in FIG. 8, in an "Order Video Synopsis" window displayed on user device 106 including a listing of times for which video is available may be provided, according to an embodiment. In the example of FIG. 8, a day listing 800 is provided along with a time listing 802 associated with the day listing 800. An indicator 806 on the day listing 800 may indicate the day for which the time listing 802 is provided.

A synopsis selector 804 may be provided along time listing 802 that provides the user with the ability to slide, expand, or contract the length of time for which a synopsis video is desired. In the example of FIG. 8, a synopsis video covering a 12 hour period from 12 PM on Tuesday May 3, 2014 through 12 AM on Wednesday May 4, 2014 is selected. By sliding selector 804 up, an earlier 12 hour time period may be selected. By sliding selector 804 down, a later time period may be selected. By increasing or decreasing the length of selector 804, the duration of time for which the synopsis is desired may be correspondingly increased or decreased.

In one embodiment, indicator 806 may include information indicating the density of detected objects throughout that day using, for example, a dot (not shown) on the indicator for each detected object at a location along the indicator that corresponds to the time in the day when the object was detected. In one embodiment, selector 804 may include information indicating the density of detected objects throughout the currently selected time period using, for example, a dot (not shown) on the selector for each detected object at a location along the selector that corresponds to the time in that time period when the object was detected. In this way, a user may be provided with the ability to quickly determine days and times at which more or fewer objects such as moving objects were recorded.

A summary window 808 may be provided that includes information indicating the time period for which selector 804 is positioned with respect to time listing 802. An "ORDER" icon 810 may be provided to the user in summary window 808 (for example) that, when clicked (or otherwise selected) sends a request to, for example, cloud computing system 110 of FIG. 1 to generate a synopsis video for the selected time period. Cloud computing system 110 may then retrieve stored background images and VMD files for video captured during the selected time period, generate one or more chapters of synopsis video by including images of detected objects from VMD files generated during the time of that chapter, and provide a notification (e.g., a text message, an email, a telephone call, an application programming interface (API) message, etc.) to the user when the synopsis video is ready to be accessed by the user.

As shown in FIG. 9, one or more synopsis videos may be stored for the user and may be listed as selectable synopsis video summaries 900 that, when selected, provide the user with the corresponding synopsis video. The selected synopsis video may be provided to the user for viewing and navigation as, for example, shown in FIG. 10.

Figure 10:
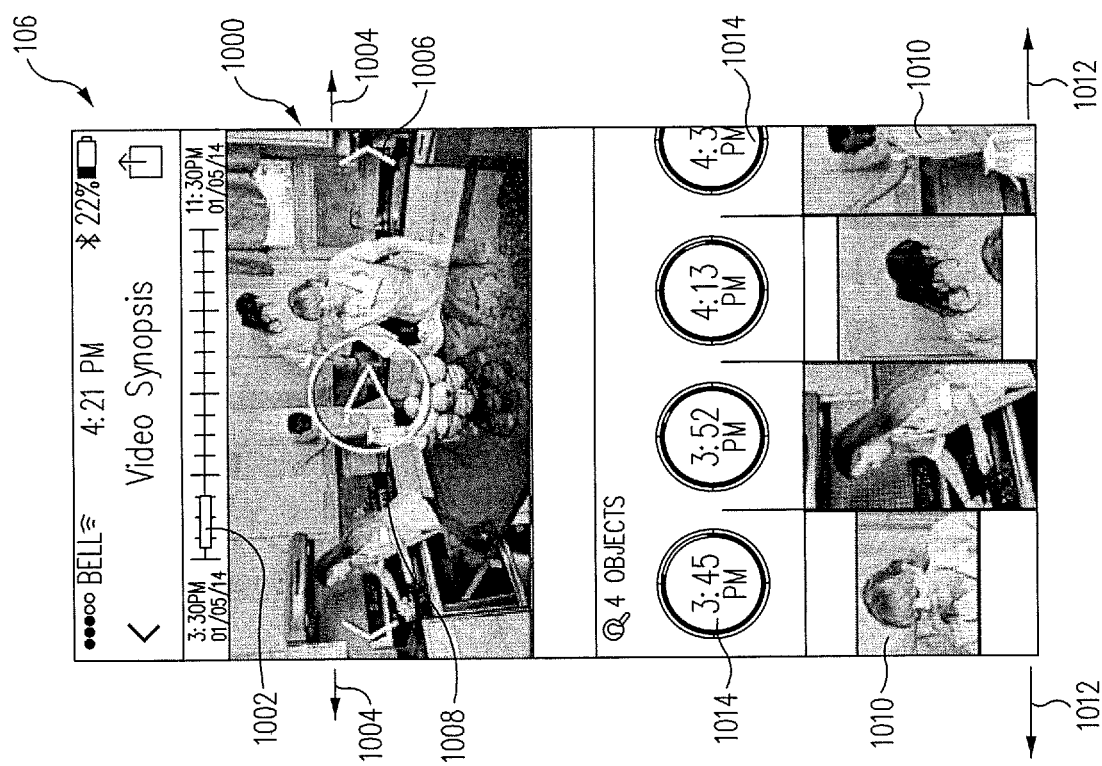
FIG. 10 is an illustrative diagram of a user device display showing how a chapter of the synopsis video may be provided with individual object indicators including images, metadata, and video links in accordance with an embodiment of the disclosure.

As shown in FIG. 10, according to an embodiment, a synopsis video chapter 1000 may be provided to the user. A chapter time indicator 1002 may be provided on a timeline that extends over the time period for which the synopsis video has been generated. Chapter time indicator 1002 may have a length and position along the timeline that indicates which portion of the overall synopsis video time period that the current synopsis video chapter 1000 includes. Chapter time indicator 1002 may include information indicating the density of detected objects throughout that chapter using, for example, a dot (not shown) on the indicator for each detected object at a location along the indicator that corresponds to the time in that chapter when the object was detected. Earlier or later synopsis video chapters may be selected by the user by sliding indicator 1002 along the timeline, by clicking left and right arrows 1006 displayed over the synopsis video chapter 1000, and/or by swiping over the synopsis video as indicated, for example, by arrows 1004.

The synopsis video chapter may be played by clicking the synopsis video chapter, a button on user device 106, and/or a virtual play button 1008. When played, a synopsis video chapter may show, at a common time, one or more objects such as moving objects that were captured by a camera at any of various times. In this way, a user may be provided with the ability to quickly view all of the activity that occurred in a particular location over a period of many minutes or hours in a relatively shorter time (e.g., a few seconds or few minutes of synopsis video).

A set of object indicators 1010 for objects in the synopsis video chapter may be provided below or near the synopsis video chapter 1000. Object indicators 1010 may each include an image of an associated object. In this way, the user may be provided with the ability to view individual detected objects separately from the synopsis. The object indicators may also be scrollable (e.g., left to right by scrolling with a mouse or by swiping as indicated by arrows 1012) so that the user can scroll through the detected object indicators to find a particular object to be viewed in the synopsis video chapter for that object.

As a user scrolls through object indicators 1010, chapter time indicator 1002 and the associated chapter synopsis video may also scroll in concert with the displayed object indicators. Metadata 1014 may also be displayed with each object indicator 1010 that indicates, as examples, the time at which the object appeared, the length of time the object was visible by one or more cameras, the type of object (e.g., a car, a human, an animal, etc.) or other information associated with the object.

Object indicators 1010 may be selectable. When a particular object indicator is selected, the full VMD file for that object may be provided to the user for viewing as shown in FIG. 11.

Figure 11:
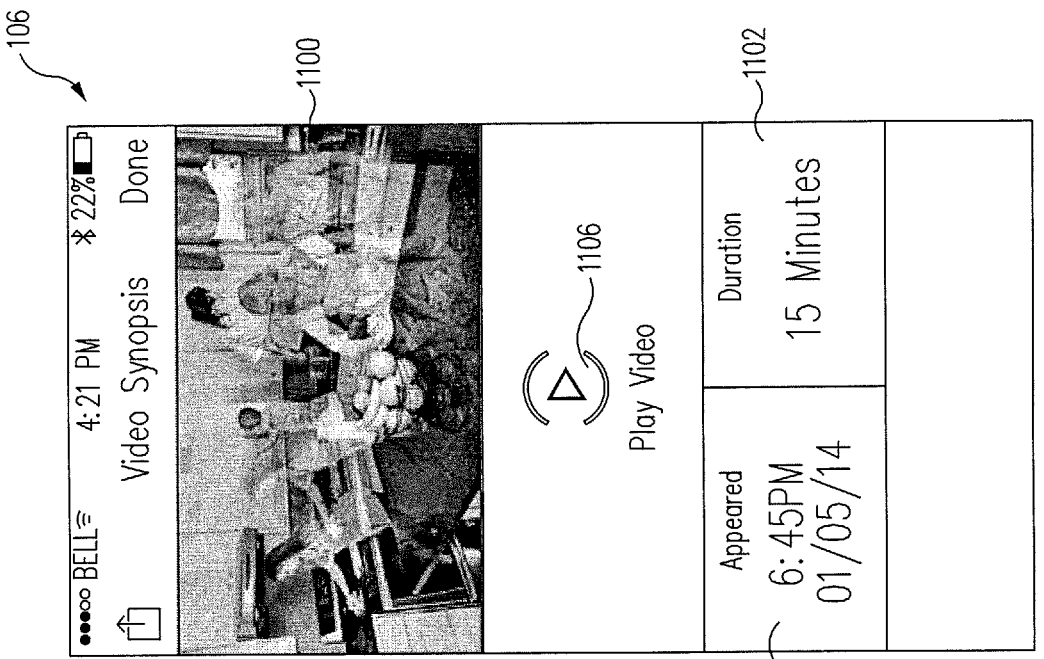
FIG. 11 is an illustrative diagram of a user device display showing how a motion image and object data for a particular object may be displayed to the user in accordance with an embodiment of the disclosure.

As shown in FIG. 11, for a particular detected object, a motion image 1100 that shows, in a single image, various positions of the selected object during the duration of the single object video file may be provided. The various positions may be indicated by semitransparent images of the object at the various positions.

Metadata such as a time of appearance 1104 and a duration 1102 of the individual object video may also be provided. The user may play the full video for the single object by clicking image 1100 or a "PLAY VIDEO" icon 1106. The single object video may be an uncompressed-time video that may or may not include other objects that were present in the field of view of the camera at the same time as the selected object. The single object video may be a full resolution video containing all of the information captured for the selected object as compared with a synopsis video in which time information or other information may be manipulated or reduced in order to show multiple objects that appeared at multiple times in a common scene.

Figure 12:
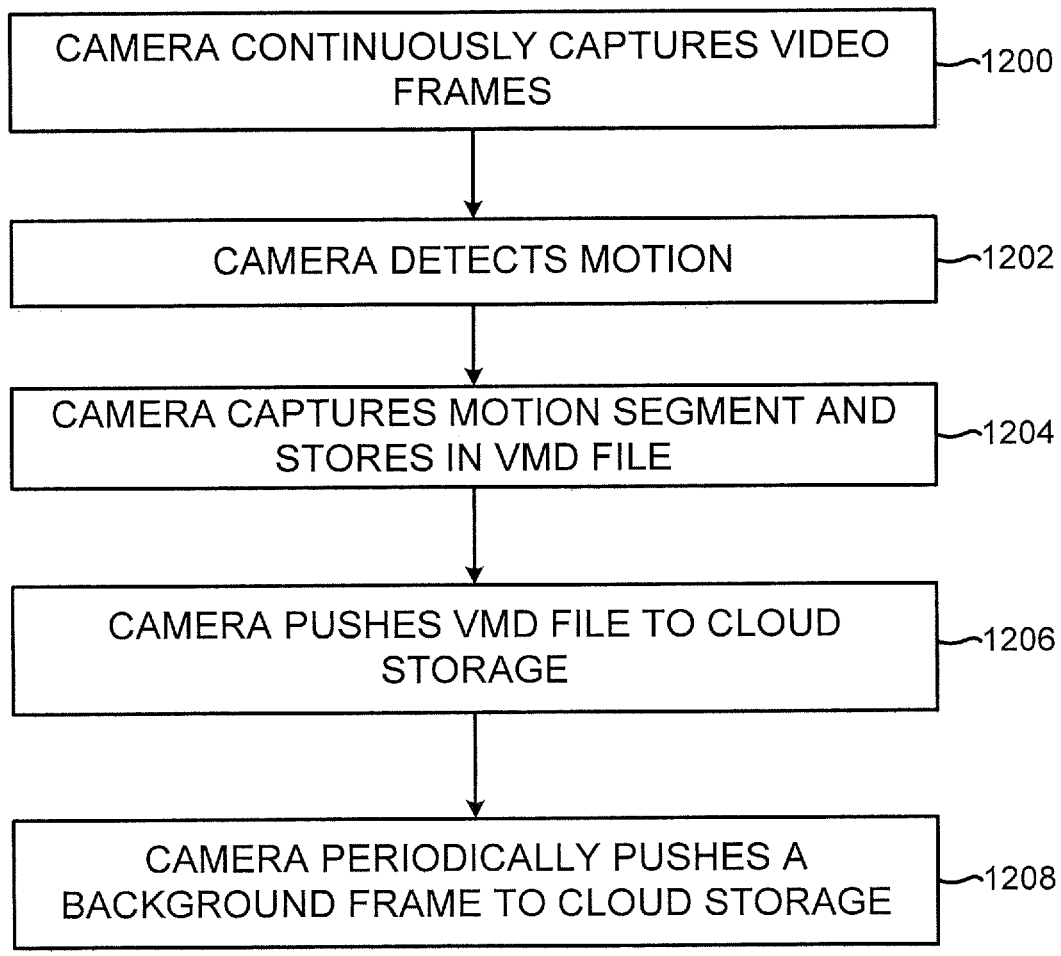
FIG. 12 is a flow chart of illustrative operations that may be performed by a network camera for providing video data for viewing and for synopsis video generation in accordance with an embodiment of the disclosure.

FIG. 12 is a flowchart of illustrative operations that may be performed by a camera for generating video images for generation of a synopsis video according to an embodiment.

At block 1200, one or more cameras such as network cameras may capture video frames. For example, a camera may continuously capture video image frames. The continuously captured video image frames may be stored permanently, stored temporarily, discarded, analyzed, and/or provided to one or more other devices such as an NVR, DVR, or a user device.

At block 1202, the camera may detect motion. For example, the camera may compare a captured video image frame to one or more previously or subsequently captured video image frame and, based on the comparison, detect a moving object in the frame. The camera may also or alternatively perform other detection operations such as sound detection or temperature detection to detect one or more objects of interest that have entered or are near the field of view of the camera.

At block 1204, the camera may capture a motion segment of video and store the motion segment in, for example, a video motion detection (VMD) file. The camera may capture the motion segment in response to the detected motion, sound, temperature, and/or other automated trigger.

At block 1206, the camera may push the VMD file to additional computing equipment such as a cloud computing system (e.g., cloud storage), a DVR, and/or an NVR. By providing VMD files captured in response to a detected object (e.g., an object that generates the automated trigger), the system can provide high value video data to be stored without requiring a continuous transfer of all video data to, for example, the cloud.

At block 1208, the camera may periodically push a background frame (e.g., a video frame without any detected moving objects) to the cloud storage. In this way, a set of periodic background images can be stored that can be used to generate a smooth background for a synopsis video. For example, if a camera is capturing video frames continuously from morning until night and a VMD file is stored for an object detected during daylight hours and for another object detected after dark, the periodic background images may be used to smoothly transition the background of a synopsis video including the two detected objects from light to dark, even though the VMD files were captured under different lighting conditions.

Figure 13:
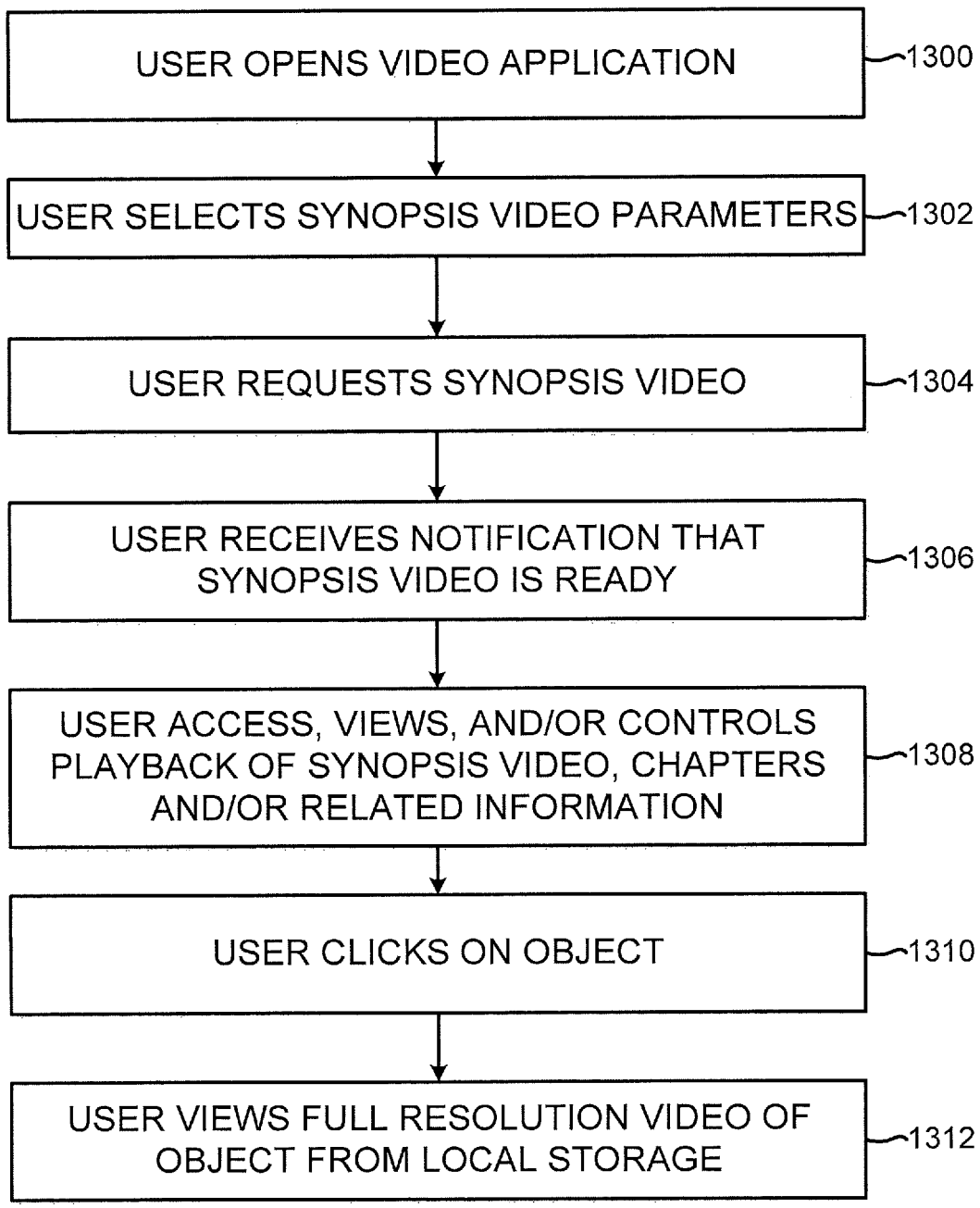
FIG. 13 is a flow chart of illustrative operations that may be performed by user for requesting, viewing, and navigating a synopsis video in accordance with an embodiment of the disclosure.

FIG. 13 is a flowchart of illustrative operations that may be performed by user of a system such as system 100 of FIG. 1 (e.g., by operating user device 106) to request, view, and navigate a synopsis video according to an embodiment.

At block 1300, the user may open a video application (e.g., a video viewing, control, and/or management application running on a user device of the user).

At block 1302, the user may select one or more synopsis video parameters such as a day, a time period, a duration, or other parameters for a synopsis video to be generated.

At block 1304, the user may request a synopsis video. The user may request the synopsis video by clicking a virtual "ORDER" button as described above in connection with FIG. 8 (as an example). When the user requests the synopsis video, the selected synopsis video parameters may be transmitted from the user device to, for example, a cloud computing system configured to generate the synopsis video for the user based on the received synopsis video parameters and using one or more VMD files and/or background images received from one or more network cameras.

At block 1306, the user may receive a notification that the requested synopsis video is ready for viewing. The notification may be a text message, a push notification received by the video application on the user device, an email, a telephone call, or other user notification or alert.

At block 1308, the user may access, view, and/or control playback of the synopsis video, chapters of the synopsis video, and/or related information. For example, the user may scroll through one or more available chapters of the synopsis video and view one or more object indicators associated with each object in each chapter, may scroll through one or more object indicators associated with each chapter, may view metadata associated with each object, and/or may play one or more synopsis video chapters in which multiple objects from multiple times are displayed at a common time.

At block 1310, the user may click on a particular one of the objects (e.g., by clicking on an object indicator such as an image of the object).

At block 1312, the user may view a full-resolution video of the object. For example, the user may receive a streaming playback of a VMD file from local storage such as the camera or a DVR or NVR. However, this is merely illustrative. In some embodiments, a single object video may be streamed to the user from cloud storage or transferred in a VMD file to the user device.

Figure 14:
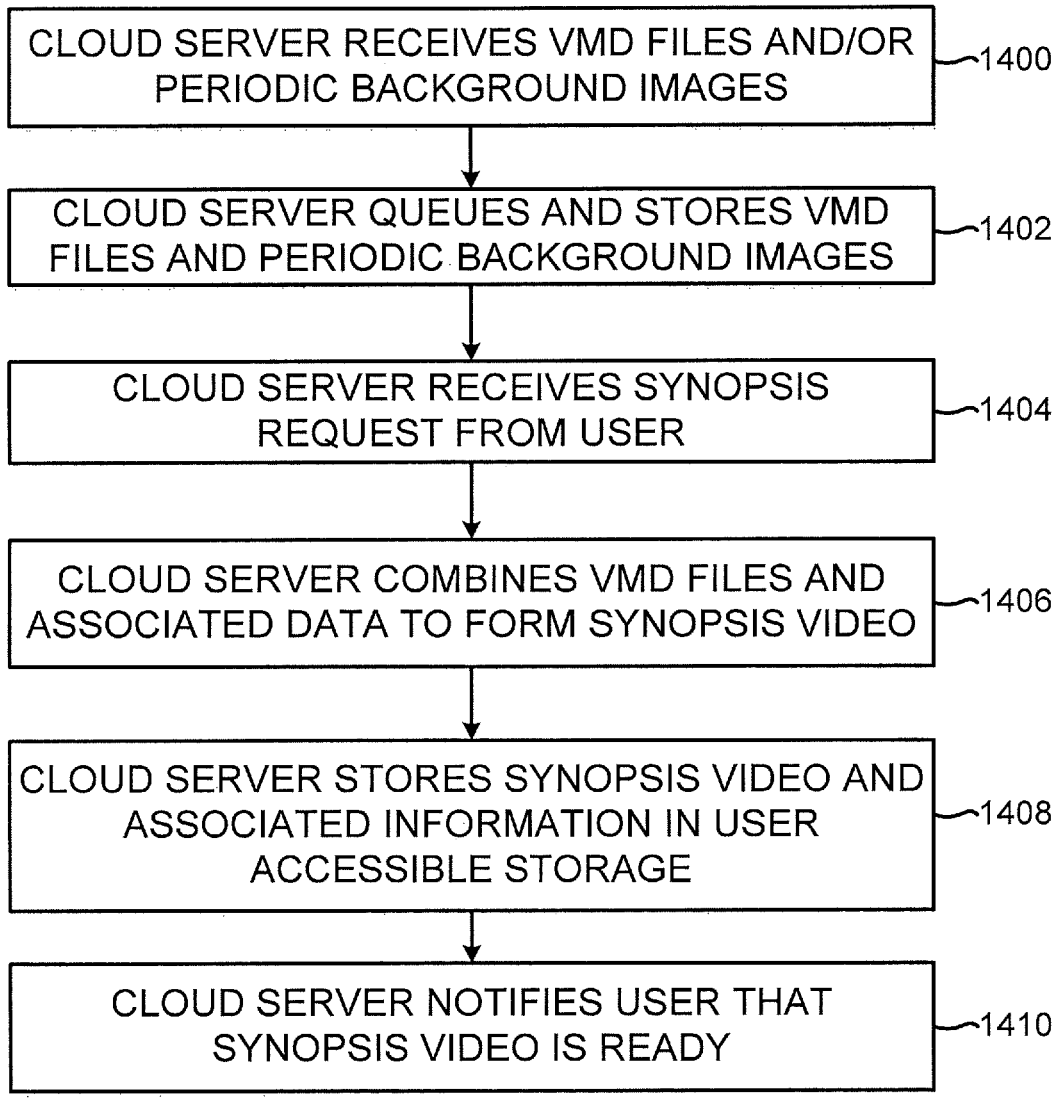
FIG. 14 is a flow chart of illustrative operations that may be performed by a synopsis video generation system for generating synopsis videos in accordance with an embodiment of the disclosure.

FIG. 14 is a flowchart of illustrative operations that may be performed by a cloud server such as cloud computing equipment 110 of system 100 of FIG. 1 to generate a synopsis video for a user, according to an embodiment.

At block 1400, the cloud server may receive one or more video motion detection (VMD) files and/or period background images (e.g., from one or more network cameras, one or more DVRs, and/or one or more NVRs) and/or other segments of video captured in response to a trigger such as a motion trigger, a sound trigger, and/or a temperature trigger.

At block 1402, the cloud server may queue and store the received VMD files and/or periodic background images.

At block 1404, the cloud server may receive a synopsis request such as a synopsis video request including one or more synopsis video parameters such as user-selected synopsis video parameters from a user. The synopsis video parameters may include a start time, a stop time, a duration, and/or other parameters for the synopsis video.

At block 1406, the cloud server may combine some or all of the stored VMD files and associated data to form the synopsis video. Combining the VMD files may include selecting VMD files generated during a time period indicated by the synopsis video parameters, determining a number of chapters for the synopsis video, extracting object images from each VMD file, and combining the extracted object images into appropriate chapters (e.g., based on the time period of the chapter and the time of the VMD file from which the object image was extracted) of the synopsis video.

Combining objects into a chapter of a synopsis video may include determining a time at which each object will appear in the synopsis video chapter, selectively increasing or decreasing the transparency of each object based on overlap with other objects, and generating a smoothly transitioning background for the synopsis video chapter using the VMD files and/or the received background images.

Combining the VMD files and associated data may include generating object indicators by extracting still images of each object from each VMD file and combining the still images with metadata for each object to form scrollable and/or selectable object indicators to be displayed along with a synopsis video chapter.

At block 1408, the cloud server may store the synopsis video and associated information such as chapter information, object indicators, metadata, and/or object density information in a user accessible storage (e.g., a secure user accessible memory).

At block 1410, the cloud server may notify the user that the synopsis video is ready. For example, the cloud server may generate a push notification, a text message, an email, or other communication or alert for the user notifying the user that the synopsis video is ready for viewing.

The systems and methods disclosed herein may be used to efficiently provide easily navigable synopsis videos and associated images, object videos, and data to a user of a system having network cameras by limiting the amount of video data that is stored and transferred, providing remote processing of the video data, and presenting the synopsis video data to the user in an intuitively searchable format.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method, comprising:
recording a video file with a camera;
providing images of an object from the video file into a chapter of a synopsis video;
providing an object indicator for the object and associated with the chapter of the synopsis video;
providing the chapter of the synopsis video, additional chapters of the synopsis video, the object indicator, and additional object indicators to a user in a scrollable arrangement;
wherein the synopsis video parameters include a time and a duration, wherein the camera is a network camera, and wherein the method further comprises receiving the video file from the network camera at computing equipment that is located remotely from the network camera
wherein the providing of the chapter of the synopsis video, the additional chapters of the synopsis video, the object indicator, and the additional object indicators to the user in the scrollable arrangement includes providing a slidable chapter time indicator that includes information indicating a density of objects within each chapter.

2. The method of claim 1, further comprising, receiving a synopsis video request from a user, and wherein the recording comprises recording the video file in response to an automated trigger.

3. The method of claim 2, further comprising, responsive to the receiving, generating the synopsis video.

4. The method of claim 3, further comprising, providing a notification to the user that the synopsis video is ready for viewing.

5. The method of claim 1, further comprising, providing the chapter of the synopsis video, additional chapters of the synopsis video, the object indicator, and additional object indicators to a user in a scrollable arrangement.

* * * * *